July 10, 1923.
L. CHARLIER
1,461,411
TRAPDOOR FOR STORAGE AND DELIVERY APPARATUS
Filed June 27, 1921
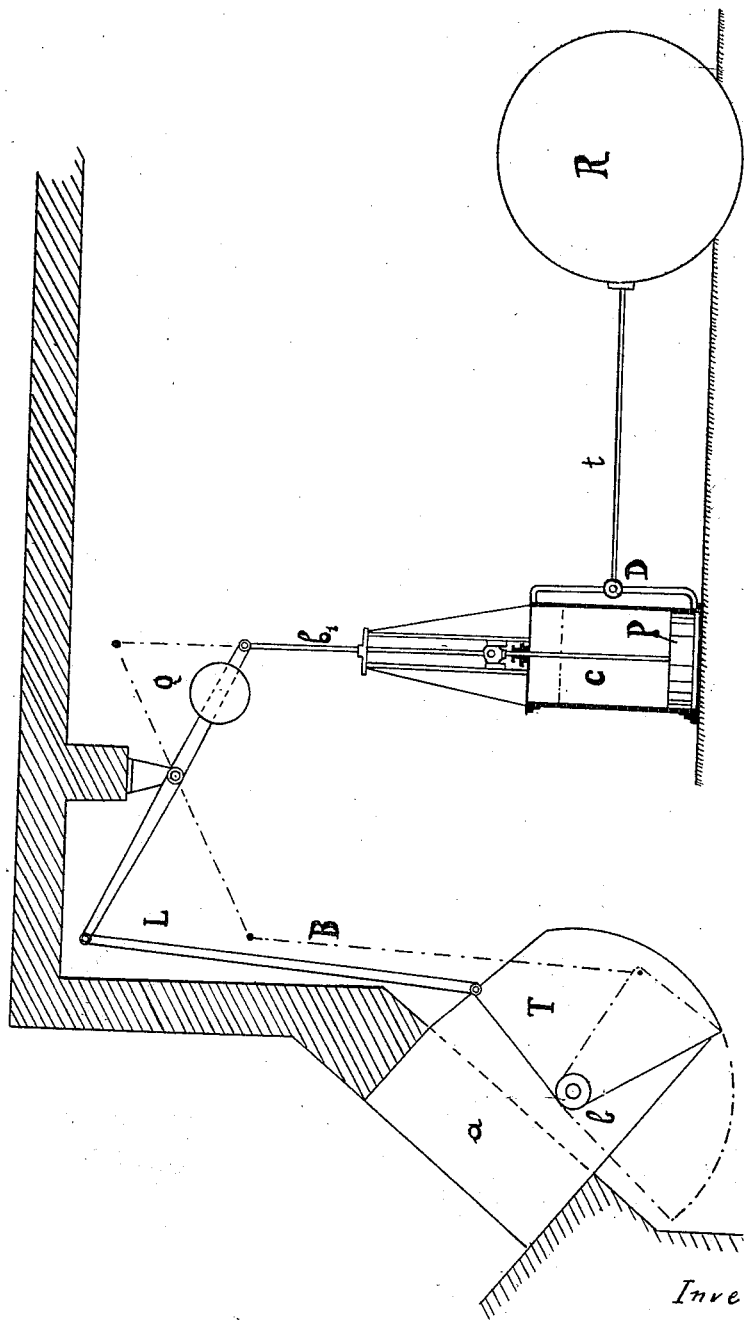
Inventor:
Louis Charlier,
By Lawrence Langner
Attorney.

Patented July 10, 1923.

1,461,411

UNITED STATES PATENT OFFICE.

LOUIS CHARLIER, OF JEMEPPE-SUR-MEUSE, BELGIUM.

TRAPDOOR FOR STORAGE AND DELIVERY APPARATUS.

Application filed June 27, 1921. Serial No. 480,879.

*To all whom it may concern:*

Be it known that I, LOUIS CHARLIER, a subject of the King of Belgium, and resident of Jemeppe-sur-Meuse, Belgium, have invented certain new and useful Improvements Relating to Trapdoors for Storage and Delivery Apparatus; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention relates to trap doors for storage and delivery apparatus such as installations comprising bins, in which ores are stored, such bins being provided with trap doors to run the contents of the bins into the conveying apparatus. These doors should, in particular have the following properties:

1. They must be very durable.
2. They must be water-tight.
3. They must have very large openings to allow of the passage of large lumps of material.
4. They must not require a great effort to work them either by hand or mechanically.
5. They must have a great delivering capacity regulatable at will.
6. They must have a minimum bulk.

The present invention provides a type of trap door which perfectly fulfills all practically required conditions.

According to the present invention the trap door comprises a metal frame having a metal cover which under the action of a counterweight, spring or other suitable device shuts the frame and opens the same by the aid of fluid under pressure or by electrical means. The trap door can be made to assume a position of rest in any position so as to regulate the size of the orifice accordingly. This trap door is of course applicable to all kinds of material such as coal, sand, ore, schist, coke etc.

In the accompanying drawing one embodiment of the invention is shown by way of example.

$a$ is a metal frame of cast iron, sheet iron, cast steel or the like of great thickness, and composed of several movable parts forming the spout through which the materials in the bin pass. This frame is provided with two pivots "$b$" on which the trap proper "T" swings, the said trap being formed of a centered wall to which two side walls are fixed at a right angle supporting the pivots for oscillation.

It is to be noted, in particular, that the trap T acts on the natural incline of the material to be removed. There cannot therefore be breakage or wedging or obstruction, or imperfect shutting by intervention of big lumps, etc.

To open the trap, compressed air, steam or other fluid is admitted, by means of a suitable distributing device, beneath a piston "P" movable in a cylinder "C."

Thus the rod "$b'$" and the counterweight "Q" are raised and the rod "B" is lowered, thus opening the trap.

As soon as the admission of compressed air is stopped the trap immediately becomes stationary and remains open in the corresponding position.

To shut the trap, the distributor "D" is operated to prevent the admission of compressed air and allow the escape of the air located under the piston. The counterweight "Q" the function of which may be performed by the piston itself then draws the trap back to the shut position.

In the case of a double-acting cylinder the distributor D after having allowed the compressed air at the lower part of the cylinder to escape will admit compressed air to the upper surface of the piston, and this will make the trap shut quicker.

Thus the trap may have any opening from maximum to minimum and this opening is regulatable as required.

R represents diagrammatically a source of compressed air.

In conclusion, the invention embodies a trap mechanically controlled essentially practical and easy.

The foregoing description is that of one constructional form of the invention.

As previously stated instead of compressed air any other fluid can be employed for example water under pressure or steam. It can also be replaced by an electro-magnet or any electric motor.

The control of a number of traps can be singly or in a group of two or more traps. This control can also be operated by a travelling mechanism or mechanisms moving opposite the trap or traps to be worked. Finally the controlling mechanism of the traps can be mounted upon a truck carrying the receptacle or receptacles to be filled, the latter arrangement presenting the great advantage of allowing the truck conductor to do all the work.

What I claim is:

1. A closure device comprising, a pivoted closure hood, a counterweight normally biasing the hood to closed position, a motor for moving the hood to open position, and a beam carrying said counterweight and operatively connecting the hood and the motor.

2. A device according to claim 1, said motor having a vertical piston member to which said beam is connected.

In testimony whereof I affix my signature in presence of two witnesses.

LOUIS CHARLIER.

Witnesses:
GEORGES VANDER HAEGHEN,
CHARLES MERCHIE.